Aug. 30, 1932.  M. M. MURFF  1,874,791
ROASTING PAN
Filed Dec. 15, 1930  2 Sheets-Sheet 1
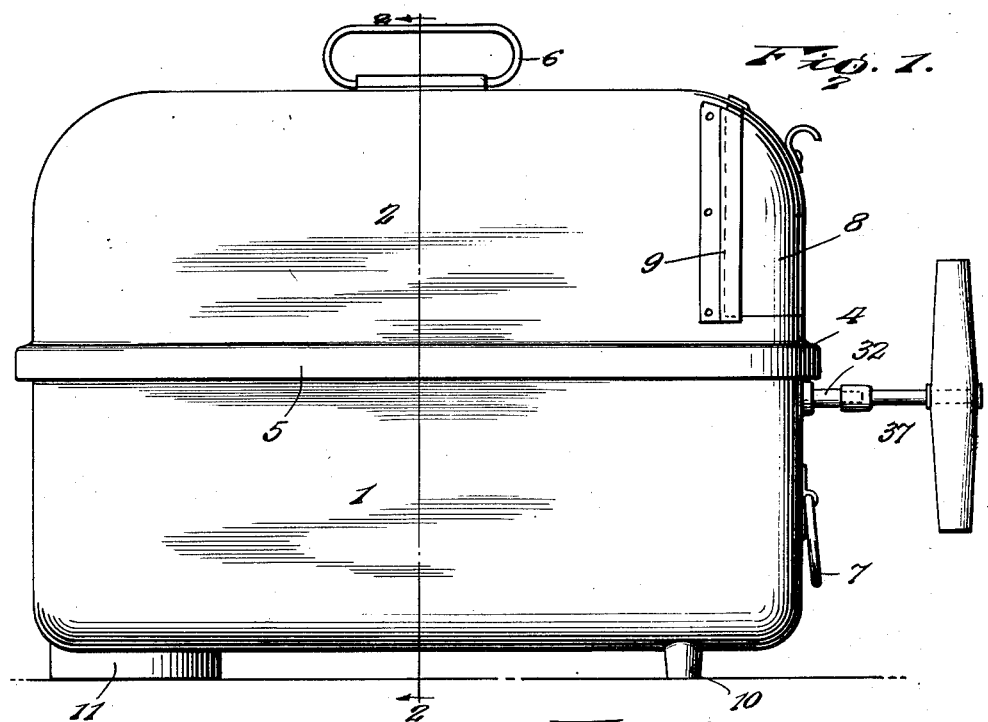
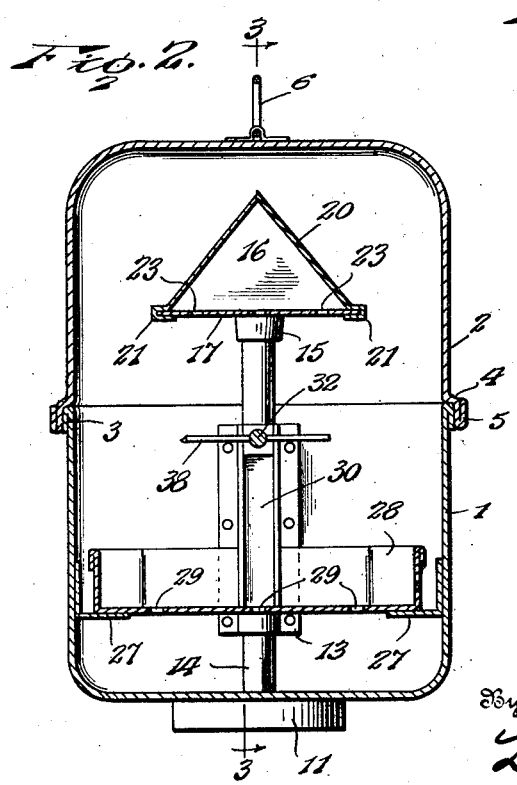
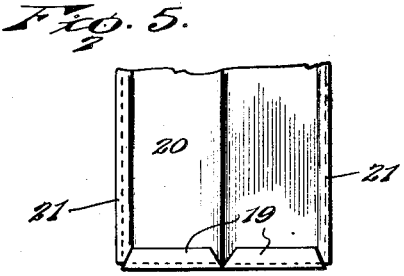
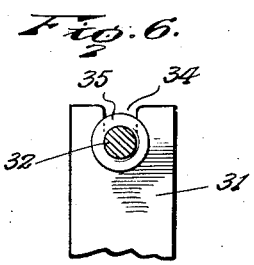
Inventor
Mabel M. Murff.
By Lacey & Lacey,
Attorney Aug. 30, 1932.　　　M. M. MURFF　　　1,874,791
ROASTING PAN
Filed Dec. 15, 1930　　2 Sheets-Sheet 2

Inventor
Mabel M. Murff.
By Lacey & Lacey,
Attorneys

Patented Aug. 30, 1932

1,874,791

UNITED STATES PATENT OFFICE

MABEL M. MURFF, OF LAWTON, OKLAHOMA

ROASTING PAN

Application filed December 15, 1930. Serial No. 502,483.

The object of this invention is to provide means whereby meat may be roasted and basted automatically and may be turned when necessary without being exposed to the outside air for any very considerable period so that the juices and flavor of the meat will be preserved. The invention provides means whereby the meat may be rotatably supported within the pan and an automatic circulation of the gravy and juices set up so that the juices will be caused to flow to an upper portion of the device and then drop onto the meat. The invention also provides means whereby the meat will be rotatably supported out of contact with the pan but in such manner that the juices dripping therefrom will be caught and set in circulation. Another object of the invention is to so construct the several parts of the device that they may be easily cleaned and kept in a thoroughly sanitary condition. The invention is illustrated in the accompanying drawings and will be hereinafter first fully described and then more particularly defined in the appended claims.

In the drawings:

Figure 1 is a side elevation of a device embodying the present invention,

Fig. 2 is a transverse section of the same on the line 2—2 of Fig. 1,

Fig. 5 is a detail plan view of one end of the upper juice and gravy-collecting member, and Fig. 6 is a detail section on the line 6—6 of Fig. 3.

Figure 3:
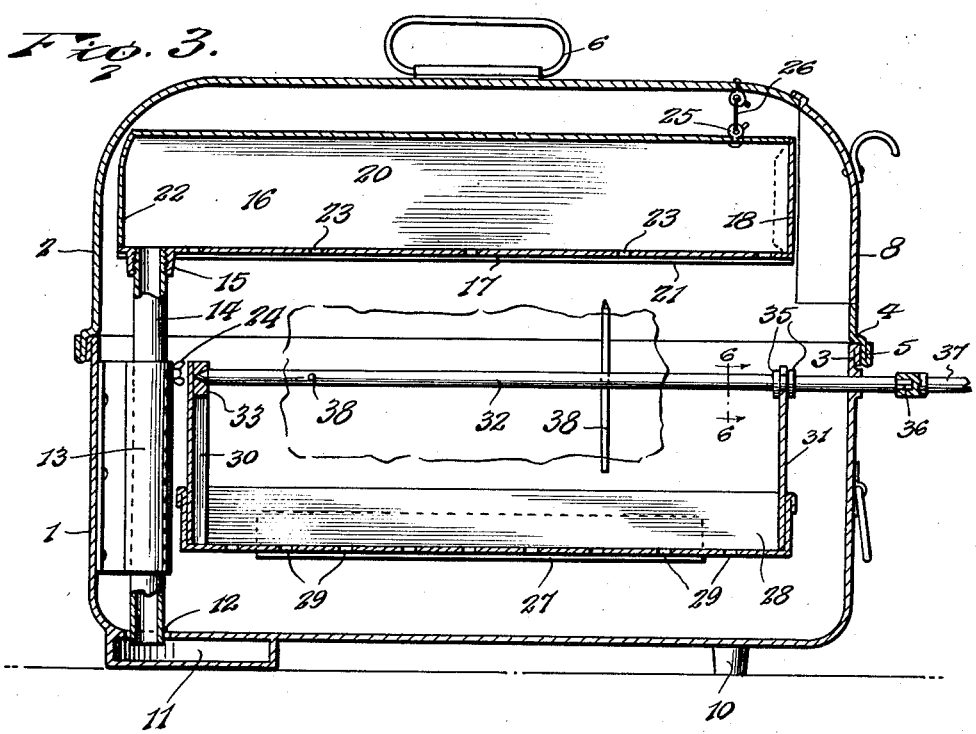
Fig. 3 is a longitudinal section on the line 3—3 of Fig. 2.
Figure 4:
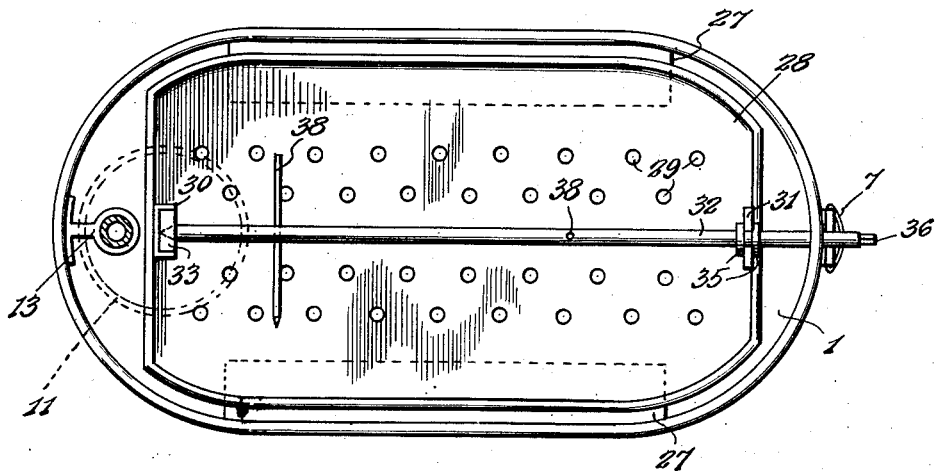
Fig. 4 is a plan view of the lower portion of the apparatus.

The device comprises a pan 1 and a cover 2 which is fitted snugly upon the pan. As shown most clearly in Figs. 2 and 3, the upper edge of the pan is doubled upon itself, as at 3, so that it presents a smooth round edge which is not apt to cut the fingers of the cook or other persons who may be using the pan. The cover is offset at its lower edge, as indicated at 4, whereby a shoulder is formed to rest upon the upper edge of the pan and the material of the cover is continued past said offset portion or shoulder and then doubled upon itself, as shown at 5, to provide a flange or bead which lies at the outer side of the flange 3 of the body of the pan. It will be noted that the flange 5 fits snugly about the flange 3 and, therefore, prevents any escape of the vapors and juice so that they will be held to the meat to be absorbed by the same in the process of cooking and thereby preserve the natural flavor and taste of the meat. Both the cover and the body of the pan are formed of sheet metal and the cover is preferably equipped with a handle loop 6 while the body is equipped with a similar handle 7 at one end. The cover is also provided at one end with a door 8 slidably held within cleats or guides 9 on the outer sides of the cover so that the meat may be inspected at intervals as desired.

The body or pan 1 is provided on its under side at one end with the usual feet 10 whereby the body will be supported out of contact with the bottom of the oven or the top of the stove and will permit circulation of the hot air below the body as well as around the sides of the same. At the opposite end, the body is provided with a well 11 of the same vertical dimension as the feet 10 so that it may also be utilized as a foot. This well is in communication with the interior of the pan through an opening 12 formed through the bottom of the pan, as clearly shown in Fig. 3, and it will be seen at once that the juices and gravy may flow from the pan into the well. Secured on the inner side of the end wall of the pan is a prop or tubular guide 13 which is in alinement with the opening 12 and through said guide or prop is disposed a stand pipe 14, the lower end of which passes through the opening 12 to establish communication with the interior of the well 11 and the upper end of which is threaded into a boss 15 on the bottom of an upper receptacle 16. As will be understood upon reference to Figs. 2, 3 and 5, this receptacle 16 includes a perforated plate 17 having the boss 15 thereon at one end and provided at its opposite end with an upstanding plate 18 of triangular form having flanges 19 on its side edges. The receptacle is completed by a cover member 20 having its side portions upwardly converging to conform to the triangular formation of the end plate 18 and provided at their lower edges with re-entrant flanges 21 slidably engaged with the side edges of the bottom plate 17, as shown most clearly in Fig. 2, and the side plates 20 are connected by an integral closing plate 22 at one end which is adapted to rest upon the upper side of the plate 17 at the end thereof, as shown in Fig. 3. When these parts are assembled, the upper member is slid along the plate 17 in engagement with the side edges of the same until the open end of said upper member abuts the plate 18 and fits under the flanges 19 of the same. The receptacle will thus be completely closed, except for the perforations 23 in the bottom plate 17. One end of the receptacle 16 is, of course, supported by the stand pipe 14 which is held in the guide or prop 13 by a set screw 24 mounted in the wall of said guide and bearing against the side of the stand pipe in an obvious manner. The opposite end of the receptacle is provided with an eye 25 in which is engaged a hook 26 suspended from the cover 2, as shown clearly in Fig. 3, so that the receptacle will be supported in a horizontal position.

Upon the sides of the pan near but spaced above the bottom thereof are shelves 27 upon which is placed a tray 28 having perforations 29 in its bottom. The tray has a rim or side of appreciable height, as clearly shown, and will be supported by the shelves 27 out of contact with the bottom of the pan. At the ends of the tray are secured posts 30 and 31 which project above the tray and are adapted to support the spit 32. The post 30 is equipped with a block 33 at its upper end having a conical recess therein in which may seat the tapered end of the spit 32 so that the spit may rotate in said bearing block without excessive friction. The post 31 is constructed with a notch 34 at its upper end and the spit is formed with annular flanges or ribs 35 which are adapted to engage opposite sides of the post and thereby prevent relative endwise movement of the spit as it is seated in the notch 34. The end of the spit passes through an opening provided therefor in the end of the pan and is given a non-circular cross sectional outline, as indicated at 36, whereby it may be engaged by a key 37 to be rotated. The tapered or pointed end of the spit not only serves to provide a needle point bearing for the spit but also facilitates the driving of the same through the piece of meat which is to be roasted and to further secure the meat upon the spit, pins 38 are driven through the meat and through openings provided therefor in the spit whereby the meat will be very securely held.

The meat to be cooked is placed upon the spit after the end thereof has been inserted through the opening in the end of the pan and the spit is then properly engaged upon the posts 30 and 31 to be supported thereby. Some water may be placed in the bottom of the pan, if desired, and the cover is then placed thereon and the device is placed in an oven or upon a stove in the usual manner for roasting or baking. The juices from the meat will drop onto the tray 28 and pass therefrom to the bottom of the pan and will find their way to the opening 12 and into the well 11. As the pan becomes heated, the juices will be set in circulation and will tend to expand so that they will rise through the stand pipe 14 and pass into the upper gravy receptacle 16 from which they will pass through the perforations 23 and drop down onto the meat in an obvious manner. This circulation will be maintained and will become more pronounced as the juices become heated. As the cooking on one side of the meat advances as will appear from inspection, the meat may be turned so as to present an uncooked portion or a less cooked portion toward the bottom of the pan where the heat is greatest and this process may be repeated from time to time so that the meat will cook uniformly through its entire volume. The device will require no attention, except an occasional inspection through the opening which is normally closed by the door 8, and will operate automatically to baste the meat continuously while it is cooking and prevent it becoming dry and hard. The device is very compact and may be handled just as an ordinary baking or roasting pan is handled. The upper member of the upper receptacle 16 may be separated from the lower member thereof by merely sliding it longitudinally and the stand pipe 14 may be withdrawn from the guide 13 by loosening the set screw 24 and then lifting the stand pipe. The spit is not secured to either of its supporting posts and may be very easily withdrawn therefrom while the tray merely rests by its own weight upon the shelves 27 and may be lifted therefrom without any exertion or trouble. It will thus be seen that all of the parts of the apparatus are accessible so that they may be thoroughly cleaned after use and kept in an entirely sanitary condition.

Having thus described the invention, I claim:

1. A roasting apparatus comprising a pan, a well on the bottom of the pan at one end of the same, the bottom of the pan having an opening therethrough to establish communication between the well and the interior of the pan, a cover fitting snugly upon the pan, a perforated tray supported within the pan above the bottom of the same, a spit mounted above the tray, a guide on one end of the pan between the same and the tray, a stand pipe held in said guide and having its lower end disposed within the well and its upper end within the cover and an upper receptacle comprising a perforated plate secured upon the upper end of the stand pipe and extending longitudinally of the cover above the spit, said perforated plate having an upstanding closure at one end, and a cover member slidably engaged with said perforated plate and having one closed end and having an open end adapted to abut the closure rising from said plate.

2. A roasting apparatus comprising a pan, a cover therefor, a perforated tray supported in the pan above the bottom thereof, an upper receptacle in the cover comprising a perforated plate having a closure rising from one end and a cover member having its side edges slidably engaged with the side edges of the perforated plate and having one end closed and its opposite open end adapted to abut and be closed by the closure on the perforated plate, and a stand pipe secured in one end of the pan with its lower end below the tray and its upper end secured to and supporting the upper receptacle.

In testimony whereof I affix my signature
MABEL M. MURFF. [L. S.]